(12) United States Patent
Geisberger et al.

(10) Patent No.: US 10,247,753 B2
(45) Date of Patent: Apr. 2, 2019

(54) MEMS DEVICE WITH OFF-AXIS SHOCK PROTECTION

(71) Applicant: NXP USA, INC., Austin, TX (US)

(72) Inventors: Aaron A. Geisberger, Austin, TX (US); Fengyuan Li, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 53 days.

(21) Appl. No.: 15/432,133

(22) Filed: Feb. 14, 2017

(65) Prior Publication Data

US 2018/0231579 A1 Aug. 16, 2018

(51) Int. Cl.
*G01P 15/125* (2006.01)
*G01P 15/08* (2006.01)

(52) U.S. Cl.
CPC .... *G01P 15/125* (2013.01); *G01P 2015/0808* (2013.01); *G01P 2015/0814* (2013.01); *G01P 2015/0831* (2013.01); *G01P 2015/0871* (2013.01)

(58) Field of Classification Search
CPC ..... G01P 2015/0871; G01P 2015/0831; G01P 2015/0834; G01P 15/125; G01P 2015/0814
USPC ...................................................... 73/514.32
See application file for complete search history.

(56) References Cited

U.S. PATENT DOCUMENTS

| | | | | |
|---|---|---|---|---|
| 5,220,835 A * | 6/1993 | Stephan | .................. | G01P 1/006 73/514.32 |
| 5,488,864 A * | 2/1996 | Stephan | ................ | G01P 15/125 73/514.32 |
| 6,865,944 B2 | 3/2005 | Glenn et al. | | |
| 7,013,730 B2 | 3/2006 | Malametz | | |
| 2003/0209073 A1* | 11/2003 | Carroll | ................... | G01P 1/006 73/504.09 |
| 2004/0035204 A1* | 2/2004 | Durante | ............. | G01C 19/5719 73/504.04 |
| 2005/0274185 A1* | 12/2005 | Lo | ......................... | G01P 15/125 73/514.01 |
| 2007/0220973 A1* | 9/2007 | Acar | .................. | G01C 19/5719 73/504.12 |
| 2010/0024554 A1* | 2/2010 | Classen | ................ | G01P 15/125 73/514.32 |

(Continued)

FOREIGN PATENT DOCUMENTS

EP 2 833 097 A2 2/2015

*Primary Examiner* — Son T Le
*Assistant Examiner* — Herbert K Roberts
(74) *Attorney, Agent, or Firm* — Charlene R. Jacobsen

(57) ABSTRACT

A microelectromechanical systems (MEMS) device, such as a single axis accelerometer, includes a movable mass suspended from a substrate. The movable mass has a first portion and a second portion. A first spring system interconnects the first portion of the movable mass with the second portion of the movable mass. A second spring system interconnects the first portion with an anchor system. The first spring system enables movement of the second portion of the movable mass in response to a shock event force imposed on the movable mass in a first direction that is orthogonal to a sense direction, wherein the first spring system inhibits movement of the first portion of the movable mass in the first direction in response to the shock event force. However, the first and second movable masses move together in response to an acceleration force in the sense direction.

19 Claims, 2 Drawing Sheets

(56) References Cited

U.S. PATENT DOCUMENTS

| | | |
|---|---|---|
| 2010/0058864 A1 | 3/2010 | Hsu et al. |
| 2010/0067083 A1* | 3/2010 | Tsuboi ............... G01C 19/5719 359/221.2 |
| 2010/0139401 A1* | 6/2010 | Schwarzelbach ... G01P 15/0802 73/514.32 |
| 2010/0281980 A1* | 11/2010 | Yazawa ................ B81B 3/0078 73/514.32 |
| 2011/0154899 A1* | 6/2011 | Classen ................ G01P 15/125 73/514.32 |
| 2012/0216616 A1* | 8/2012 | Schultz ................ G01P 15/125 73/514.38 |
| 2012/0297879 A1* | 11/2012 | Ullrich ................. G01P 15/125 73/514.32 |
| 2013/0042686 A1* | 2/2013 | Lin ....................... G01P 15/125 73/514.32 |
| 2013/0192364 A1* | 8/2013 | Acar .................. G01C 19/5733 73/504.12 |
| 2014/0007685 A1* | 1/2014 | Zhang .................. G01P 15/125 73/514.32 |
| 2014/0090468 A1 | 4/2014 | Fu |
| 2014/0144231 A1* | 5/2014 | Lin ....................... G01C 19/574 73/504.12 |
| 2014/0238132 A1* | 8/2014 | Jeong .................... G01P 15/097 73/514.29 |
| 2014/0260613 A1 | 9/2014 | Qiu et al. |
| 2014/0283605 A1* | 9/2014 | Baldasarre ............ G01P 15/125 73/514.32 |
| 2015/0041927 A1* | 2/2015 | Geisberger ........... B81B 3/0027 257/415 |
| 2015/0068308 A1* | 3/2015 | Blomqvist ............ B81B 7/0058 73/504.12 |
| 2015/0075285 A1* | 3/2015 | Ariki .................. G01C 19/5733 73/514.32 |
| 2015/0143907 A1* | 5/2015 | Ullrich .................. B81B 3/0051 73/514.32 |
| 2015/0192603 A1* | 7/2015 | Baldasarre ............ G01P 15/125 73/514.32 |
| 2015/0241216 A1* | 8/2015 | Ahtee ................. G01C 19/5712 73/504.12 |
| 2015/0268268 A1* | 9/2015 | Liu ....................... G01P 15/125 73/514.32 |
| 2015/0309069 A1* | 10/2015 | Boillot .................. B81B 3/0051 73/514.38 |
| 2016/0084872 A1* | 3/2016 | Naumann ............. G01P 15/125 73/514.32 |
| 2016/0216290 A1* | 7/2016 | Tang ..................... G01P 15/125 |
| 2016/0370180 A1* | 12/2016 | Naumann .......... G01C 19/5733 |

* cited by examiner

MEMS DEVICE WITH OFF-AXIS SHOCK PROTECTION

TECHNICAL FIELD OF THE INVENTION

The present invention relates generally to microelectromechanical systems (MEMS) sensors. More specifically, the present invention relates to a MEMS device, such as a sensor, with protection from off-axis shock events.

BACKGROUND OF THE INVENTION

Microelectromechanical Systems (MEMS) sensors are widely used in applications such as automotive, inertial guidance systems, household appliances, protection systems for a variety of devices, and many other industrial, scientific, and engineering systems. Such MEMS sensors are used to sense a physical condition such as acceleration, pressure, angular rotation, or temperature, and to provide an electrical signal representative of the sensed physical condition.

Capacitive MEMS accelerometers typically include a movable mass that is suspended from a substrate. The movable mass moves, i.e., rotates or translates depending upon the design and sensing direction, in response to an acceleration force. Motion of the movable mass results in a change in electrical capacitance, with respect to the acceleration force, to vary the output of an energized circuit. MEMS accelerometers are often subject to high acceleration forces, referred to herein as shock events, in off-axis directions. Unfortunately, the spring suspension designs used to suspend a movable mass may not be robust to such shock events leading to device failure.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns microelectromechanical systems (MEMS) devices with improved robustness to off-axis acceleration forces, referred to herein as shock events. These MEMS devices can include inertial sensors such as MEMS accelerometers, and in particular, single-axis MEMS accelerometers that sense acceleration along a single axis (e.g., X-direction, Y-direction, or Z-direction). More particularly, a MEMS device includes a movable mass configuration, sometimes called a proof mass, that includes a first portion and a second portion interconnected by a first spring system. The first portion of the movable mass is directly connected to a second spring system that suspends the movable mass from a substrate. The first portion is limited to movement only in a single degree-of-freedom sensing direction. The second portion of the movable mass is provided with additional flexibility in an off-axis direction via the first spring system such that it can potentially move into motion limiting structures in the off-axis direction in response to shock events. This movable mass configuration can increase the suspension robustness of a single axis MEMS sensor device while not disrupting the desired performance of the device. That is, by limiting motion of the first portion to the sensing direction, the transducer suspension spring and anchoring system can be protected from off-axis high acceleration force (i.e., high-g) shock events.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
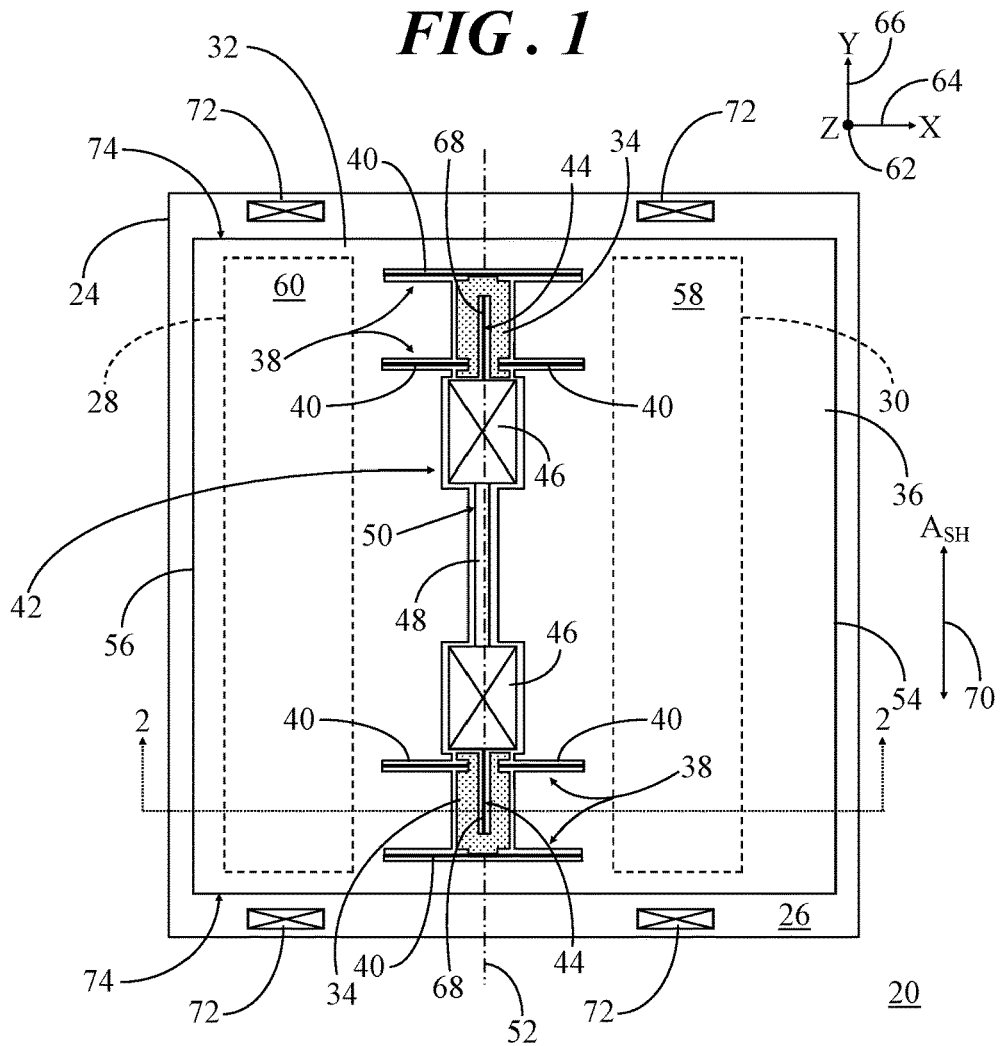
FIG. 1 shows in a simplified and representative form a top view of a microelectromechanical systems (MEMS) device in accordance with an embodiment.
Figure 2:
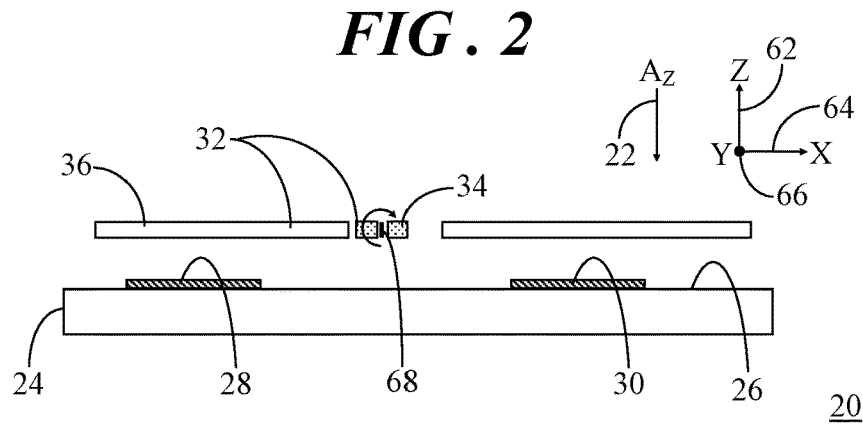
FIG. 2 shows a side view of the MEMS device along section lines 2-2 of FIG. 1.

Referring to FIGS. 1 and 2, FIG. 1 shows in a simplified and representative form a top view of a microelectromechanical systems (MEMS) device 20 in accordance with an embodiment, and FIG. 2 shows a side view of the MEMS device 20 along section lines 2-2 of FIG. 1. MEMS device 20 is in the form of an accelerometer and is constructed as a "teeter-totter" type sensor. As such, MEMS device 20 is adapted to sense acceleration, and in particular Z-axis acceleration, $A_Z$, represented by an arrow 22 in FIG. 2. MEMS device 20 will be referred to hereinafter as Z-axis accelerometer 20.

Z-axis accelerometer 20 includes a substrate 24 having a generally planar surface 26. Electrode elements 28, 30 are formed on planar surface 26 of substrate 24. A movable mass 32, sometimes referred to as a proof mass, is positioned in spaced apart relationship above planar surface 26 of substrate 24. It should be observed that electrode elements 28, 30 are obscured from view in FIG. 1 by the overlying movable mass 32. As such, electrode elements 28, 30 represented in FIG. 1 by dashed line boxes. In FIG. 2, electrode elements 28, 30 are visible and they are shaded by a rightwardly and downwardly hatched pattern for illustrative purposes.

Movable mass 32 has a first portion 34 and a second portion 36. In the illustrated example, second portion 36 surrounds first portion 34 of movable mass 32, and electrode elements 28, 30 underlie the larger second portion 36 of movable mass 32. However, in other embodiments, first portion 34 of movable mass 32 may be larger such that electrode elements 28, 30 may be located underneath both of first and second portions 34, 36 or only underneath first portion 34 of movable mass. First portion 34 of movable mass 32 is shaded with a stippled pattern to clearly distinguish it from second portion 36 of movable mass 32. It should be understood, however, that first and second portions 34, 36 of movable mass 32 are formed concurrently of the same material during the same process operations.

A first spring system 38 interconnects first portion 34 of movable mass 32 with second portion 36 of movable mass. In a particular example, first spring system 38 includes a plurality of straight beam flexures 40 interconnecting first portion 34 with second portion 36. Additionally, an anchor system 42 is coupled to surface 26 of substrate 24, and a second spring system 44 interconnects first portion 34 of movable mass 32 with anchor system 42. In this example, anchor system 42 includes two anchors 46 physically coupled with substrate 24 and a stiff beam 48 interconnected to each of the two anchors 46 and suspended above surface of substrate 24. The physical coupling of anchors 46 to substrate 24 is denoted by an "X" extending through each of anchors 46. Together, anchor system 42 and second spring system 44 function to suspend first and second portions 34 and 36 of movable mass 32 from surface 26 of substrate 24 so that an airgap exists between movable mass 32 and electrode elements 28, 30 (best seen in FIG. 2). The components of Z-axis accelerometer 20 may be formed using existing and upcoming MEMS fabrication design rules and processes that include, for example, deposition, patterning, and etching.

As shown, an opening 50 extends through movable mass 32. Anchor system 42 is positioned at an approximate center of opening 50 along an axis of rotation 52 of movable mass 32 between a first end 54 and a second end 56 of movable mass 32. When intended for operation as a teeter-totter type accelerometer, a first section 58 of movable mass 32 on one side of axis of rotation 52 is formed with relatively greater mass than a second section 60 of movable mass 32 on the other side of axis of rotation 52. In an example embodiment, the greater mass of first section 58 may be created by offsetting axis of rotation 52 such that first section 58 is longer than second section 60. In alternative embodiments, this difference in mass may be accomplished by adding mass to first section 58 through an additional layer of material, by removing mass from second section 60 relative to first section 58, and so forth.

As mentioned above, Z-axis accelerometer 20 is configured to detect an acceleration force, i.e., Z-axis acceleration 22, along a Z-axis 62 perpendicular to surface 26 of substrate 24 in a three dimensional coordinate system that further includes an X-axis 64 and a Y-axis 66. In this example, X-axis 64 and a Y-axis 66 are substantially parallel to surface 26 of substrate 24. Thus, by convention, X-axis 64 is directed rightward and leftward on the page, Y-axis 66 is directed upward and downward on the page, and Z-axis 62 is directed out of the page in FIG. 1. Correspondingly, in the side view illustration of FIG. 2, the three dimensional coordinate system is represented in which X-axis 64 is directed rightward and leftward on the page, Z-axis 62 is directed upward and downward on the page, and Y-axis 66 is directed out of the page.

Accordingly, second spring system 44 includes torsion springs 68 that enable movable mass 32 to rotate about axis of rotation 52 (where axis of rotation 52 is substantially parallel to Y-axis 62) in response to Z-axis acceleration 22. In particular, due to their interconnection via flexures 40 of first spring system 38, second spring system 44 enables first and second portions 34, 36 of movable mass 32 to move together about axis of rotation 52 in response to Z-axis acceleration 22. Thus, movable mass 32 changes its position relative to the underlying sensing electrode elements 28, 30 in response to Z-axis acceleration 22. This change in position results in a set of capacitances whose difference, i.e., a differential capacitance, is indicative of the magnitude of Z-axis acceleration 22.

In single axis accelerometers, a typical object of design is to produce an accelerometer design such that the resulting behavior closely matches a single-degree-of-freedom system. Such a design constraint calls for a spring suspension design (e.g., anchor system 42 with second spring system 44) having high stiffness in the off-axis direction. Although such spring suspension designs may be good at matching the desired ideal behavior, they may not be robust, i.e., resistant to, high acceleration shock events in off-axis directions. In FIG. 1, such an undesired shock acceleration, referred to herein as a shock event, $A_{SH}$, 70 is represented by an arrow that is substantially parallel to Y-axis 66. In this undesired direction, torsion springs 68 may be very stiff which results in substantial loading at anchors 46, stiff beam 48, or other features of anchor system 42 and second spring system 44.

In order to enhance the suspension robustness, movable mass 32 is separated into first and second portions 34, 36. Under Z-axis acceleration 22, both portions 34, 36 pivot about axis of rotation 52. However, in response to shock event 70, only second portion 36 is able to move a significant amount. That is, second portion 36 is provided with additional flexibility via the use of flexures 40 of first spring system 38. Thus, second portion 36 can translate in a direction substantially parallel to Y-axis 66 in response to the undesired shock event 70. By incorporating this design feature, second portion 36 of movable mass 32 can translate into contact with a rigid-stop or motion limiting structures 72. In this example, motion limiting structures 72 coupled to surface 26 of substrate 24 are laterally displaced away from an outer perimeter 74 of second portion 36 of movable mass 32.

However, flexures 40 are generally rigid or resistant to flexing in the sense direction parallel to Z-axis 62. Accordingly, the separation of movable mass 32 into first and second portions 34, 36 with first spring system 38 interconnecting them inhibits translational movement of first portion 34 of movable mass 32 in a direction substantially parallel to Y-axis 66 in response to shock event 70. As such, first portion 34 of movable mass 32 is largely limited to purely rotational motion about axis of rotation 52. Therefore, anchor system 42 and second spring system 44 are not subject to the potentially damaging effects of high-g loading from shock event 70.

The components of Z-axis accelerometer 20 are shown in a highly simplified form. Those skilled in the art will recognize that movable mass 32 may have a different shape then at that shown. Additionally, flexures 40 and/or torsion springs 68 may have different shapes, e.g., serpentine configurations, and the like. Further, although anchor system 42 and second spring system 44 are shown as being connected to an interior of movable mass 32, it should be understood that reversed configuration is equivalently applicable. For example, a first portion of a movable mass that is coupled to a substrate via a spring suspension system may surround a second portion of a movable mass, where the second portion is able to move in response to a shock event and the first portion is largely limited to pure single axis sense motion. Still further, a suitable spring system may interconnect a first portion and a second portion of a movable mass in which the second portion may be enabled to translate in two directions substantially parallel to the surface of the substrate in response to shock events in two off-axis directions, whereas the first portion of the movable mass interconnected with a spring suspension system is limited to pure single axis sense motion.

Figure 3:
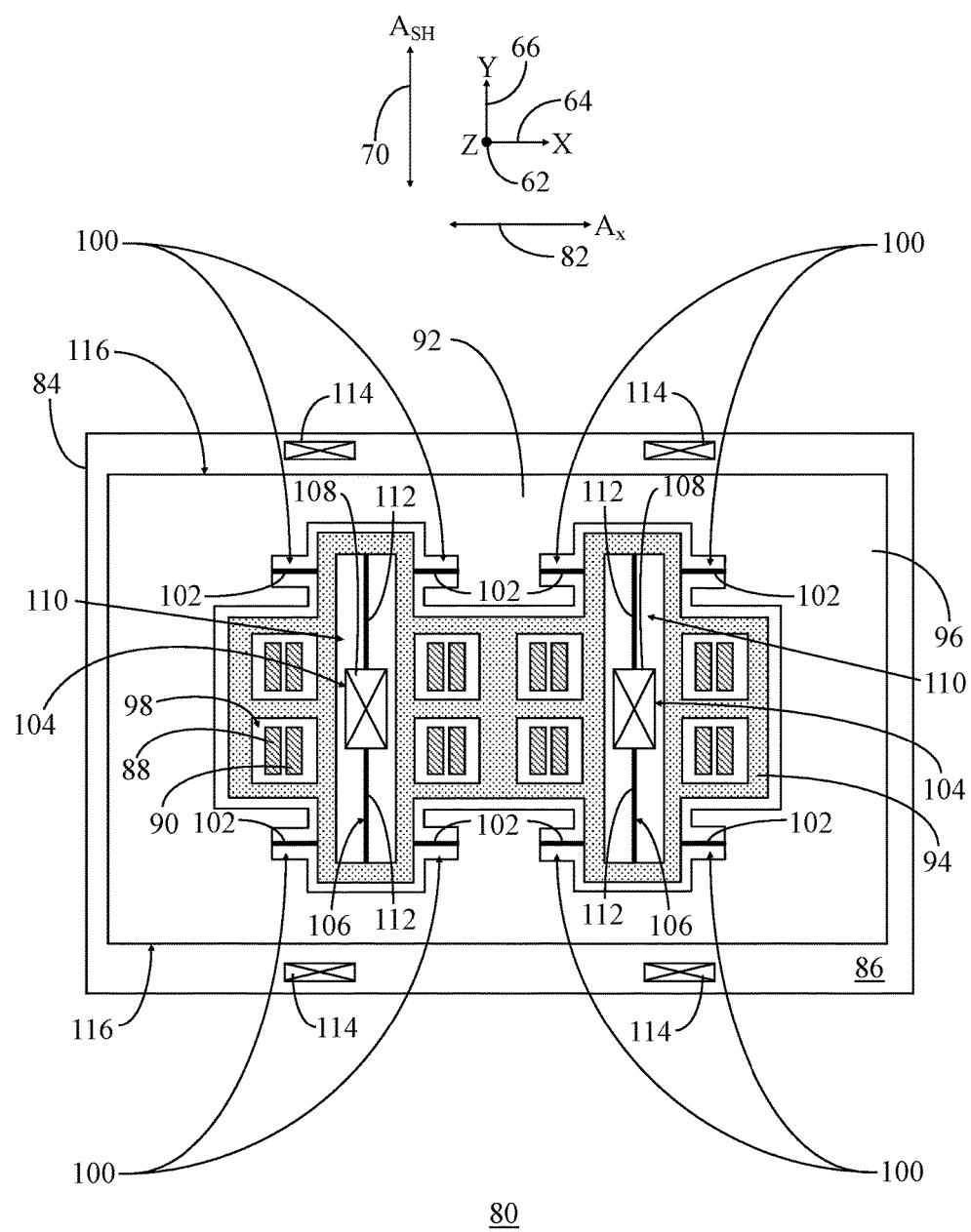
FIG. 3 shows in a simplified and representative form a top view of a MEMS device in accordance with another embodiment.

FIG. 3 shows in a simplified and representative form a top view of a MEMS device 80 in accordance with another embodiment. MEMS device 80 is in the form of an accelerometer and is adapted to sense an acceleration force, and in particular X-axis acceleration, $A_X$, represented by an arrow 82, that is parallel to X-axis 64. MEMS device 80 will be referred to hereinafter as X-axis accelerometer 80. Of course, it should be readily apparent that by rotating X-axis accelerometer 80 by ninety degrees, it would be equivalently capable of sensing a Y-axis acceleration force parallel to Y-axis 66.

X-axis accelerometer 80 includes a substrate 84 having a generally planar surface 86. Pairs of electrode elements 88, 90 are formed on planar surface 86 of substrate 84. A movable mass 92 is positioned in spaced apart relationship above planar surface 86 of substrate 84. Again, electrode elements 88, 90 are shaded by a rightwardly and downwardly hatched pattern for illustrative purposes.

Movable mass 92 has a first portion 94 and a second portion 96. In the illustrated example, second portion 96 surrounds first portion 94 of movable mass 92. In contrast to Z-axis accelerometer 20 (FIG. 1), electrode elements 88, 90 reside in openings 98 formed in first portion 94 of movable mass 92. However, in other embodiments, openings may be formed in second portion 96 of movable mass 92 in which electrode elements 88, 90 reside. Again, first portion 94 of movable mass 92 is shaded with a stippled pattern to clearly distinguish it from second portion 96 of movable mass 92. It should be understood, however, that first and second portions 94, 96 of movable mass 92 are formed concurrently of the same material during the same process operations.

A first spring system 100 interconnects first portion 94 of movable mass 92 with second portion 96 of movable mass 92. In a particular example, first spring system 100 includes a plurality of straight beam flexures 102 interconnecting first portion 94 with second portion 96. Additionally, an anchor system 104 is coupled to surface 86 of substrate 84, and a second spring system 106 interconnects first portion 94 of movable mass 92 with anchor system 104. In this example, anchor system 104 includes two anchors 108 physically coupled with substrate 84 and laterally displaced away from one another in a direction substantially parallel to X-axis 64. The physical coupling of anchors 108 to substrate 24 is denoted by an "X" extending through each of anchors 108. Together, anchor system 104 and second spring system 106 function to suspend first and second portions 94, 96 of movable mass 92 from surface 86 of substrate 84.

As shown, openings 110 extend through first portion 94 of movable mass 92. Anchors 108 of anchor system 104 are positioned at an approximate center of each of openings 110. As mentioned above, X-axis accelerometer 80 is configured to detect an acceleration force, i.e., X-axis acceleration 82, along X-axis 64 substantially parallel to surface 86 of substrate 84. Accordingly, second spring system 106 includes springs 112 also residing in openings 110 that are interconnected between each of anchors 108 and first portion 94 of movable mass 92. Springs 112 enable movable mass 92 to translate in a sense direction substantially parallel to the sense axis, i.e., X-axis 64, in response to X-axis acceleration 82. In particular, due to their interconnection via flexures 102 of first spring system 100, second spring system 106 enables first and second portions 94, 96 of movable mass 92 to move together substantially parallel to X-axis 64 in response to X-axis acceleration 82. Thus, movable mass 92 changes its position relative to the pairs of sensing electrode elements 88, 90 in response to X-axis acceleration 82. This change in position results in a set of capacitances whose difference, i.e., a differential capacitance, is indicative of the magnitude of X-axis acceleration 82.

Under X-axis acceleration 82, both portions 94, 96 of movable mass 92 translate together substantially parallel to X-axis 64. However, in response to shock event 70 (substantially parallel to Y-axis 66), only second portion 96 is able to move. That is, second portion 96 is provided with additional flexibility via the use of flexures 102 of first spring system 100. Thus, second portion 96 can translate in a direction substantially parallel to Y-axis 66 in response to the undesired shock event 70 and potentially translate into contact with motion limiting structures 114. In this example, motion limiting structures 114 are coupled to surface 86 of substrate 84 and are laterally displaced away from an outer perimeter 116 of second portion 96 of movable mass 92.

However, flexures 102 are generally rigid or resistant to flexing in the sense direction parallel to X-axis 64. Accordingly, the separation of movable mass 92 into first and second portions 94, 96 with first spring system 100 interconnecting them inhibits translational movement of first portion 94 of movable mass 92 in a direction substantially parallel to Y-axis 66 in response to shock event 70. As such, first portion 94 of movable mass 92 is largely limited to purely translational motion in the sense direction substantially parallel to X-axis 64. Therefore, anchor system 104 and second spring system 106 are not subject to the potentially damaging effects of high-g loading from shock event 70.

The components of X-axis accelerometer 80 are shown in a highly simplified form. Those skilled in the art will recognize that movable mass 92 may have a different shape then at that shown. Additionally, flexures 102 and/or springs 112 may have great variety of shapes, e.g., serpentine configurations, and the like.

In summary, MEMS devices with improved robustness to high-g shock events are discloses. An embodiment of a MEMS device comprises a substrate, a movable mass suspended from the substrate, the movable mass having a first portion and a second portion, and a spring system interconnecting the first portion of the movable mass with the second portion of the movable mass, the spring system enabling movement of the second portion of the movable mass in response to a first force imposed upon the movable mass in a first direction that is orthogonal to a sense direction, wherein the spring system inhibits movement of the first portion of the movable mass in the first direction in response to the first force.

Another embodiment of a MEMS device comprises a substrate, a movable mass suspended from the substrate, the movable mass having a first portion and a second portion, the second portion surrounding the first portion, at least one motion limiting structure laterally displaced away from an outer perimeter of the second portion of the movable mass, and a spring system interconnecting the first portion of the movable mass with the second portion of the movable mass. The spring system enables movement of the second portion of the movable mass in response to a first force imposed upon the movable mass in a first direction that is orthogonal to a sense direction, wherein when the second portion of the movable mass moves in the first direction in response to the first force, the second portion of the movable mass contacts the at least one motion limiting structure, and wherein the spring system inhibits movement of the first portion of the movable mass in the first direction in response to the first force.

Yet another embodiment of a MEMS device comprises a substrate, a movable mass suspended from the substrate, the movable mass having a first portion and a second portion, a first spring system interconnecting the first portion of the movable mass with the second portion of the movable mass, the first spring system including a plurality of spring elements, each of the spring elements enabling motion of the second portion of the movable mass in response to a first force imposed upon the movable mass in a first direction that is orthogonal to a sense direction. An anchor system is coupled to the substrate and a second spring system interconnects the first portion of the movable mass with the anchor system to suspend the movable mass from the substrate. The second spring system enables the first and second portions of the movable mass to move together in response to a second force imposed upon the movable mass in the sense direction, wherein each of the spring elements of the first spring system are rigid in the sense direction such that the first spring system inhibits movement of the first portion of the movable mass in the first direction in response to the first force.

Embodiments described herein can yield MEMS devices, and in particular single-axis MEMS accelerometer devices, with improved robustness to off-axis shock events. A movable mass configuration that includes a first portion and a second portion interconnected by a first spring system, where the first portion is limited to movement only in a single direction and the second portion is provided with additional flexibility in an off-axis direction via the interconnecting first spring system can increase the suspension robustness of a single axis MEMS sensor device while not disrupting the desired performance of the device. That is, by limiting motion of the first portion to the sensing direction, the transducer suspension spring and anchoring system can be protected from off-axis high acceleration force (i.e., high-g) shock events.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A microelectromechanical systems (MEMS) device comprising:
   a substrate;
   a movable mass suspended from said substrate, said movable mass having a first portion and a second portion; and
   a spring system interconnecting said first portion of said movable mass with said second portion of said movable mass, said spring system enabling translational movement of said second portion of said movable mass in response to a first force imposed upon said movable mass in a first direction that is orthogonal to a sense direction, wherein said spring system inhibits movement of said first portion of said movable mass in said first direction in response to said first force, and wherein said first direction is parallel to a surface of said substrate such that said translational movement of said second portion of said movable mass in response to said first force is oriented substantially parallel to said surface of said substrate, said first and second portions of said movable mass are configured to move together in response to a second force imposed upon said movable mass in said sense direction, and said first portion is limited to a single degree-of-freedom motion in said sense direction.

2. The MEMS device of claim 1 wherein said second portion of said movable mass surrounds said first portion of said movable mass.

3. The MEMS device of claim 1 further comprising at least one motion limiting structure laterally displaced away from an outer perimeter of said second portion of said movable mass in said first direction, wherein when said second portion of said movable mass moves in said first direction in response to said first force, said second portion of said movable mass contacts said at least one motion limiting structure.

4. The MEMS device of claim 1 wherein said spring system comprises a plurality of spring elements, each of said spring elements enabling motion of said second portion of said movable mass in said first direction and said each of said spring elements being rigid in said sense direction.

5. The MEMS device of claim 1 wherein said spring system comprises a plurality of straight beam flexures interconnecting said first portion of said movable mass with said second portion of said movable mass.

6. The MEMS device of claim 1 wherein said spring system is a first spring system, and said MEMS device further comprises:
   an anchor system coupled to said substrate; and
   a second spring system interconnecting said first portion of said movable mass with said anchor system, said second spring system enabling said first and second portions of said movable mass to move together in response to said second force imposed upon said movable mass in said sense direction.

7. The MEMS device of claim 6 wherein said first spring system isolates said anchor system and said second spring system from movement in said first direction in response to said first force.

8. The MEMS device of claim 6 wherein said sense direction is substantially perpendicular to a surface of said substrate, and said second spring system comprises a torsion spring for enabling movement of said first and second portions of said movable mass about a rotational axis that is substantially parallel to said surface of said substrate in response to said second force imposed upon said movable mass in said sense direction.

9. The MEMS device of claim 8 further comprising sense electrodes formed on said surface of said substrate and underlying said second portion of said movable mass.

10. The MEMS device of claim 6 wherein said sense direction is substantially parallel to a surface of said substrate, and said second spring system comprises spring elements for enabling translational motion of said first and second portions of said movable mass in response to said second force imposed upon said movable mass in said sense direction.

11. The MEMS device of claim 10 wherein:
said first portion of said movable mass includes a plurality of movable electrodes; and
said MEMS device further comprises fixed electrodes formed on said substrate in proximity to said movable electrodes of said first portion of said movable mass.

12. A microelectromechanical systems (MEMS) device comprising:
a substrate;
a movable mass suspended from said substrate, said movable mass having a first portion and a second portion, said second portion surrounding said first portion;
at least one motion limiting structure laterally displaced away from an outer perimeter of said second portion of said movable mass; and
a spring system interconnecting said first portion of said movable mass with said second portion of said movable mass, said spring system enabling translational movement of said second portion of said movable mass in response to a first force imposed upon said movable mass in a first direction that is orthogonal to a sense direction, wherein when said second portion of said movable mass moves in said first direction in response to said first force, said second portion of said movable mass contacts said at least one motion limiting structure, and wherein said spring system inhibits movement of said first portion of said movable mass in said first direction in response to said first force, and wherein said first direction is parallel to a surface of said substrate such that said translational movement of said second portion of said movable mass in response to said first force is oriented substantially parallel to said surface of said substrate, said first and second portions of said movable mass are configured to move together in response to a second force imposed upon said movable mass in said sense direction, and said first portion is limited to a single degree-of-freedom motion in said sense direction.

13. The MEMS device of claim 12 wherein said movement of said second portion of said movable mass in response to said first force is substantially parallel to a surface of said substrate.

14. The MEMS device of claim 12 wherein said spring system comprises a plurality of straight beam flexures interconnecting said first portion of said movable mass with said second portion of said movable mass.

15. The MEMS device of claim 12 wherein said spring system is a first spring system, and said MEMS device further comprises:
an anchor system coupled to said substrate; and
a second spring system interconnecting said first portion of said movable mass with said anchor system, said second spring system enabling said first and second portions of said movable mass to move together in response to said second force imposed upon said movable mass in said sense direction.

16. A microelectromechanical systems (MEMS) device comprising:
a substrate;
a movable mass suspended from said substrate, said movable mass having a first portion and a second portion;
a first spring system interconnecting said first portion of said movable mass with said second portion of said movable mass, said first spring system including a plurality of spring elements, each of said spring elements enabling translational movement of said second portion of said movable mass in response to a first force imposed upon said movable mass in a first direction that is orthogonal to a sense direction, wherein said first direction is parallel to a surface of said substrate such that said translational movement of said second portion of said movable mass in response to said first force is oriented substantially parallel to said surface of said substrate;
an anchor system coupled to said substrate; and
a second spring system interconnecting said first portion of said movable mass with said anchor system to suspend said movable mass from said substrate, said second spring system enabling said first and second portions of said movable mass to move together in response to a second force imposed upon said movable mass in said sense direction, wherein said each of said spring elements of said first spring system are rigid in said sense direction such that said first spring system inhibits movement of said first portion of said movable mass in said first direction in response to said first force such that said first portion is limited to a single degree-of-freedom motion in said sense direction.

17. The MEMS device of claim 16 wherein said first spring system isolates said anchor system and said second spring system from movement in said first direction in response to said first force.

18. The MEMS device of claim 16 wherein:
said sense direction is substantially perpendicular to a surface of said substrate;
said second spring system comprises a torsion spring for enabling motion of said first and second portions of said movable mass about a rotational axis that is substantially parallel to said surface of said substrate in response to said second force imposed upon said movable mass in said sense direction; and
said MEMS device further comprises sense electrodes formed on said surface of said substrate and underlying said second portion of said movable mass.

19. The MEMS device of claim 16 wherein:
said sense direction is substantially parallel to a surface of said substrate;
said second spring system comprises spring elements for enabling translational motion of said first and second portions of said movable mass in response to said second force imposed upon said movable mass in said sense direction; and
said MEMS device further comprises fixed electrodes formed on said substrate in proximity to movable electrodes of said first portion of said movable mass.

* * * * *